417-46 SR

11/4/86 OR 000,163

United States Statutory Invention Registration [19]

[11] Reg. Number: H163

Spraker et al.

[43] Published: Nov. 4, 1986

[54] SINGLE CHAMBER RECHARGER

[75] Inventors: William J. Spraker, Ridgecrest; Willard F. Simpson, Inyokern, both of Calif.

[73] Assignee: The United States of America as represented by the Secretary of the Navy, Washington, D.C.

[21] Appl. No.: 835,856

[22] Filed: Feb. 10, 1986

[51] Int. Cl.[4] ..... F04B 49/00

[52] U.S. Cl. ..... 417/46

[56] References Cited

U.S. PATENT DOCUMENTS

| | | | |
|---|---|---|---|
| 3,005,417 | 10/1961 | Swaney | 103/238 |
| 3,090,325 | 5/1963 | Ross | 103/238 |
| 3,397,576 | 8/1968 | Peres | 73/200 |
| 3,489,159 | 1/1970 | Cheng et al. | 137/14 |
| 3,730,203 | 5/1973 | Katzer et al. | 137/14 |

*Primary Examiner*—Harold J. Tudor

*Attorney, Agent, or Firm*—Robert F. Beers; W. Thom Skeer; W. D. English

[57] ABSTRACT

The invention discloses a self-controlled, portable gas compressor which utilizes a low pressure air source to compress a high pressure air source in a single stage booster compressor pump which is automatically shut down by an air pilot switch when a predetermined pressure is reached.

23 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

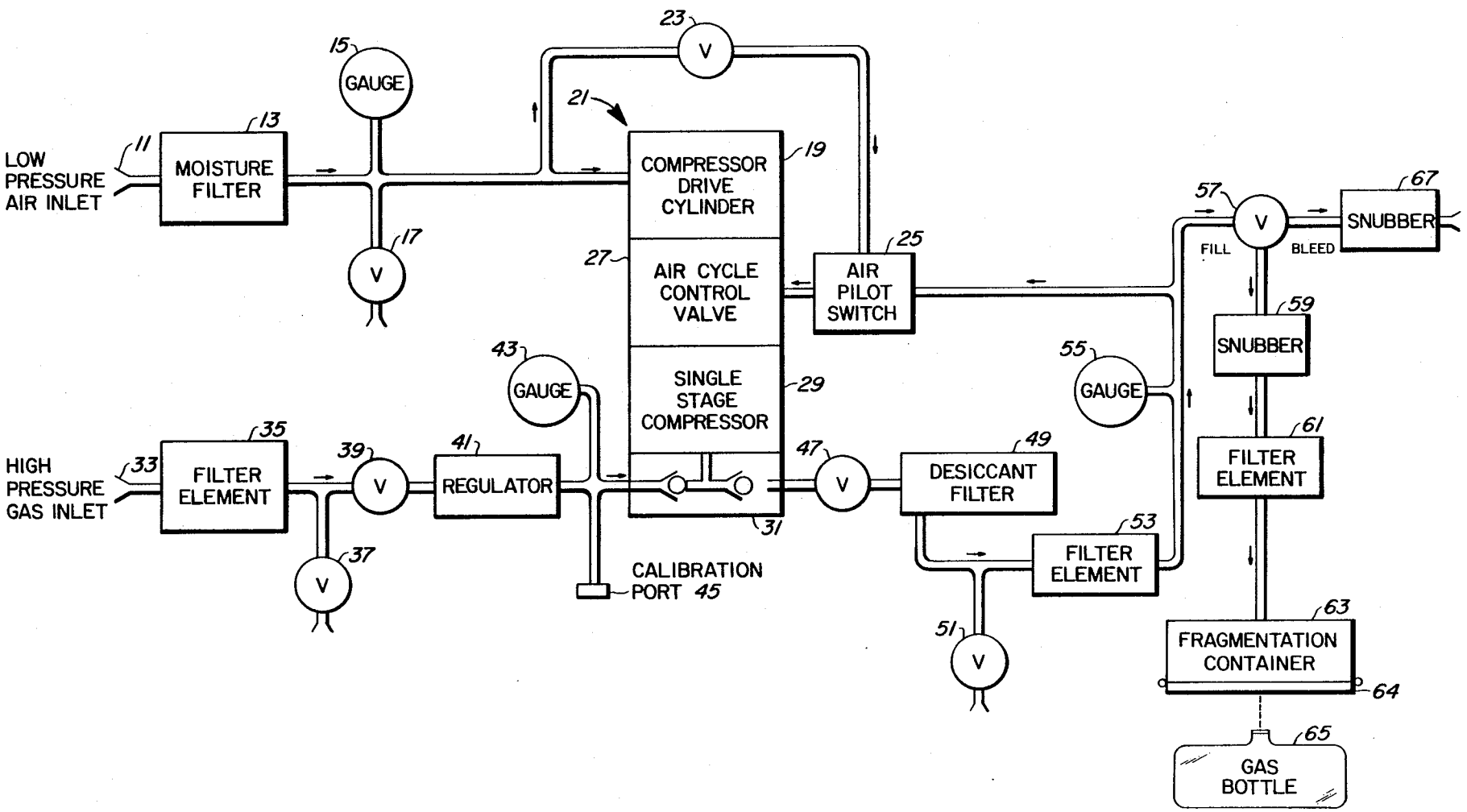
SNUBBER
67
BLEED
FILL
57
SNUBBER
59
FILTER ELEMENT
61
FRAGMENTATION CONTAINER
63
64
GAS BOTTLE
65
GAUGE
55
FILTER ELEMENT
53
DESICCANT FILTER
49
51
AIR PILOT SWITCH
25
47
COMPRESSOR DRIVE CYLINDER
19
AIR CYCLE CONTROL VALVE
27
SINGLE STAGE COMPRESSOR
29
31
CALIBRATION PORT 45
23
21
GAUGE
43
REGULATOR
41
GAUGE
15
17
39
37
MOISTURE FILTER
13
FILTER ELEMENT
35
11
33
LOW PRESSURE AIR INLET
HIGH PRESSURE GAS INLET

SINGLE CHAMBER RECHARGER

BACKGROUND OF THE INVENTION

1. Field of the Invention

The invention relates to the disciplines of fluidics and mechanics. More specifically, the invention relates to the field of gas compressors. In particular, the invention discloses a lightweight, compact, self-contained-power-source, portable air compressor.

2. Description of the Prior Art

Gas compressing and pressurizing devices are used in a great variety of applications. High pressure gas tanks have been applied in communication with low pressure gas reservoirs and appropriate plumbing to sustain continuous pressure in a plurality of tanks containing liquids to provide a continuous controlled liquid flow from a plurality of holding tanks. Similar devices obtain similar objectives by utilizing a continuous flow displacement pump which functions by means of cycling pistons spool valves, moving in a reciprocating manner by pneumatic and alternating communication with a high pressure gas and a low pressure gas.

Other gas compressing devices have utilized a gas or diesel fired engine to compress a high pressure gas to an even higher pressure by means of a two stage air compressor pump. In such systems pneumatic and electrically operated pressure switches determine when a predetermined high pressure is achieved to shut the system, compressor, down. Such gas compressor systems have inherent limitations, however, in that the systems are large, heavy, bulky and comprise many electrical and mechanical components. Several Pneumatic valves, various filters, size, and weight of such systems and the numerousity of many components do not make the system susceptible to convenient portability, low maintenance and high reliability. In addition, such compressors required gas or diesel fired engines for compressor/pump power as well as external electrical power of both three phase, 220 volt, 60 Hz, and single phase, 110 volt, 60 Hz; many European and military applications cannot accomodate such standard electrical power requirements.

A significant limitation in such two stage pumps, to prevent interstage stall, is that the gas to be compressed must be at least 250 psi to be compressible, but less than 1500 psi. Again, in many applications it is desirable to use gas bottles having pressures of 6000 psi as the gas input to the compressor and since only 5000 psi is the desired output, the system won't work, and should the gas input fall below 250 psi, the compressor is unable to compress the gas.

In view of the prior art, there exist a continuing need for a high reliability compact, lightweight, and self-regulated gas compressor for use in remote military applications when convenient portability is necessary and electrical power requirements vary or are non existant, and where gas/diesel driven engines are unnecessary.

SUMMARY OF THE INVENTION

The invention is a highly simplified, compact, lightweight, portable air compressor which uses a low pressure air source to compress a gas to a predetermined high pressure by means of a single stage gas compressor/pump, the operation of which is monitored by a pressure sensitive/pneumatically controlled airpilot switch. Should the gas source be at a value higher than the desired predetermined output, a gas regulator valve operates to reduce the pressure thereof and the single stage compressor is not utilized. Various filters, gauges, and bleed valves included in the system increase efficiency, utility, and safety factors of the overall gas compressor system.

OBJECTS OF THE INVENTION

It is a primary object of the invention to provide a lightweight, compact, portable gas compressor.

Another object of the invention is to provide a portable gas compressor of few components, thereby increasing system reliability and decreasing system down time.

A further object of the invention is to use a low pressure air source to compress a high pressure gas source to a predetermined higher pressure.

Yet, another object of the invention is to provide a portable gas compressor capable of reducing a high pressure gas to a predetermined pressure as well as increasing a low pressure gas to said predetermined pressure.

These and other advantageous features and objects of the invention will become more apparent upon consideration of the following detailed description of a preferred embodiment of the invention in view of the accompanying drawing.

BRIEF DESCRIPTION OF THE DRAWING

The FIGURE represents a schematic/pictorial illustration of the overall invention.

DESCRIPTION OF A PREFERRED EMBODIMENT

The single chamber recharger (SCR) described herein provides a means of recharging coolant pressure tanks with air, nitrogen, or argon gasses used in cooling refrigerated detector units in guided missiles. The SCR is designed as a portable unit equipped with handles for ease of movement and has a single fragmentation chamber for charging one coolant tank at a time. The simplicity of design and operation make the SCR valuable for deployed activities. No electrical power is required; the only requirements are a drive air source and a source gas to be compressed.

Referring to the flow diagram schematic of the FIGURE, the drive air source, which may be a standard shop air hose of 60–150 psi, 18 standard $ft^3$/min, enters the system at a low pressure air inlet 11. On passing through a moisture filter 13 (F309–04, Arrow), the airdrive pressure is measured by an airdrive pressure gauge 15 (138016, Ametek) and may be vented through a pressure relief valve 17 (NRV250B, Rego) should the pressure exceed 150 psi. The drive air then enters a compressor drive cylinder 19 of a booster compressor/-pump 21 (AG–62, Hoskel) and concomitantly passes through a manually controlled air drive valve 23 (7115F454, Hoke), which controls the drive air to booster compressor 21, to an air pilot switch 25 (51940–4, Haskel). Air pilot switch 25 in turn is coupled to an air cycle control/spool valve 27 of booster compressor/pump 21. Spool valve 27 causes the driveair source in compressor drive cylinder 19 to cyclically operate upon a single stage compressor cylinder 29 to compress a high pressure gas confined by one way valves 31 of booster compressor/pump 21.

A high pressure gas, 500 psi or higher, enters the system at a high pressure gas inlet 33 and initially passes through a first filter element 35 (10990/20666-4-2, Mectron). A manually operated inlet bleed valve 37 (15859, Dragon Valve) allows the high pressure system to be purged prior to operation of the system and to bleed inlet lines for disconnection. The high pressure gas then passes through a manually controlled booster inlet valve 39 (15859, Dragon Valve) for controlled flow of the high pressure gas into a regulator valve 41 (26-3120-24-007, Tescon) which reduces a high pressure gas, in excess of 5000 psi, down to the desired 5100 psi output of the system. A gas regulated pressure gauge 43 (25504-37B21, 3-D), which indicates gas supply pressure to booster compressor 21, and calibration port 45 are included in the system for monitoring the high pressure gas. The high pressure gas then passes through one way valves 31 of booster compressor 21, and if the gas is of a pressure below 5000 psi, it is boosted to 5100±100 psi. The boosted high pressure gas from the output of booster compressor 21 is then applied via a high pressure relief valve 47 (7741-4, Haskel), set to vent at 5500 psig to prevent excessive gas pressure, to a dessicant purifier filter 49 (NR-6000, Air Dry). A manually operated system bleed valve 51 (15859, Dragon Valve) following filter 49 allows the boosted gas system to be purged if desirable. A two micron mechanical filter 53 (6124-16, Air Dry) following filter 49 removes any remaining mechanical contaminants, and a gas boosted pressure gauge 55 (25504-37B21, 3-D) permits monitoring of boosted gas pressure at the output of purifier/filter 49.

When the boosted gas reaches a pressure of 5100±100 psi, a sensing device in airpilot switch 25 will shut off drive air 11 to booster compressor drive cylinder 19 stopping further compression of high pressure gas 33. When the boosted gas pressure drops to 4500 psi the sensing device in airpilot switch 25 will again open and allow drive air 11 to booster compressor 21.

Boosted gas at a pressure of 5100±100 psi then passes through a manually operated three way fill station valve 57 (7644F4Y, Hoke), when set at "FILL", via a first snubber 59 (27201, Haskel) and a second ten micron mechanical filter element 61 (10989/20666-4-2, Mectron) to a fragmentation/coolant tank chamber 63 to fill an ultra high pressure gas bottle 65. When set at "BLEED", fill station valve 57 vents boosted gas through a second snubber 67 to harmlessly and noiselessly vent boosted gas in the line to enable a safe removal of gas bottle 65 when filled.

Mode of Operation

Prior to connecting a high pressure source gas 33, e.g. Nitrogen or Argon, and prior to connecting a drive air source 11, e.g. a shop air hose/supply, it must be assured that air drive valve 23, booster inlet valve 39, inlet bleed valve 37, and system bleed valve 51 are in a closed position and further that fill station valve 57 is in the "BLEED" position. Once done, the high pressure gas source 33 is connected, the drive air source 11 is connected, and coolant gas bottle 65 to be filled is inserted in fragmentation container 63 and door 64 closed, and locked. Now, fill station valve 57 is set to "FILL" position, booster inlet valve 39 is opened and air drive valve 23 is opened. Gas bottle 65 will now fill to a pressure of 5100±100 psi at which time air pilot switch 25 will shut the system down. To remove filled bottle 65, fill station valve 57 is set to "BLEED." At this point, door 64 may be opened and filled bottle 65 may safely be removed. The foregoing steps may then be repeated to fill succeeding gas bottles.

Although there has been described herein above a particular arrangement of a gas compressing/pressurizing device for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the following claims.

What is claimed is:

1. A portable fluid compressor, comprising:

means for providing a low pressure fluid source;

means for providing a high pressure fluid source;

means, coupled between said low pressure fluid source and said high pressure fluid source, for enabling said low pressure fluid to compress said high pressure fluid to a boosted high pressure fluid;

means, coupled between said low pressure fluid source and said boosted high pressure fluid source, for shutting down said enabling means when a predetermined boosted high pressure fluid is achieved;

means, coupled to said compression enabling means, for desiccanting, purifying, and filtering said boosted high pressure fluid; and fragmentation containment means, coupled to said desiccanting means for holding a vessel to be filled with said boosted high pressure fluid.

2. A portable gas compressor, comprising:

means for providing a low pressure air source;

means for providing a high pressure gas source;

means, coupled between said low pressure air source and said high pressure gas source, for enabling said low pressure air to compress said high pressure gas to a boosted high pressure gas;

means, coupled between said low pressure air source and said boosted high pressure gas source, for shutting down said enabling means when a predetermined boosted high pressure gas is achieved;

means, coupled to said compression enabling means, for desiccanting, purifying, and filtering said boosted high pressure gas; and fragmentation containment means, coupled to said desiccanting means for holding a vessel to be filled with said boosted high pressure gas.

3. A portable gas compressor according to claim 2, wherein said low pressure air source may be a conventional shop air supply capable of yielding 80 to 150 psi.

4. A portable gas compressor according to claim 2, wherein said high pressure gas source may be a conventional high pressure gas bottle capable of containing a gas pressure of 500 to 5000 psi.

5. A portable gas compressor according to claim 2, wherein said compression enabling means may be a conventional booster pump having a pneumatically operated air drive piston/cylinder in communication with a single stage gas compressor piston/cylinder, an aircycle control valve, and requisite one-way gasflow valves.

6. A portable gas compressor according to claim 2, wherein said shutting down means may be a conventional air pilot switch in series with a manually operated air drive valve.

7. A portable gas compressor according to claim 2, further having air driven pressure gauge coupled between said low pressure air source and said compression enabling means.

8. A portable gas compressor according to claim 7, further having a low pressure relief valve coupled between said low pressure air source and said air drive pressure gauge.

9. A portable gas compressor according to claim 8, further having a moisture filter coupled between said low pressure air source and said pressure relief valve.

10. A portable gas compressor according to claim 2, further having an air regulated pressure gauge coupled between said high pressure gas source and said compression enabling means.

11. A portable gas compressor according to claim 10, further having a gas pressure calibration port coupled between said high pressure gas source and said air regulated pressure gauge.

12. A portable gas compressor according to claim 11, further having an adjustable gas regulator disposed between said high pressure gas source and said calibration port.

13. A portable gas compressor according to claim 12, further having a booster inlet valve disposed between said high pressure gas source and said adjustable gas regulator.

14. A portable gas compressor according to claim 13, further having a gas inlet bleed valve disposed between said high pressure gas source and said booster inlet valve.

15. A portable gas compressor according to claim 14, further having a first 10 micron filter disposed between said high pressure gas source and said gas inlet bleed valve.

16. A portable gas compressor according to claim 2, further having a adjustable high pressure gas relief valve disposed between said compression enabling means and said disiccanting means.

17. A portable gas compressor according to claim 2, further having a gas boosted pressure gauge coupled between said desiccanting means and said vessel holding means.

18. A portable gas compressor according to claim 17, further having a system bleed valve disposed between said desiccanting means and said gas boosted pressure gauge.

19. A portable gas compressor according to claim 18, further having a two micron filter disposed between said system bleed valve and said gas boosted pressure gauge.

20. A portable gas compressor according to claim 2, further having a manually operated three-way fill station valve coupled between said gas boosted pressure gauge and said vessel holding means.

21. A portable gas compressor according to claim 20, further having a first snubber coupled to said fill station valve.

22. A portable gas compressor according to claim 20, further having a second snubber coupled between said fill station valve and said vessel holding means.

23. A portable gas compressor according to claim 21, further having a second 10 micron filter element coupled between said first snubber and said vessel holding means.

* * * * *